United States Patent
Fennema (10) Patent No.: US 10,505,656 B2
(45) Date of Patent: Dec. 10, 2019

(54) OPTICAL WAVELENGTH SELECTIVE SWITCHES WITH GUARD BANDS

(71) Applicant: Nokia Solutions And Networks Oy, Espoo (FI)

(72) Inventor: Alan A Fennema, San Jose, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/939,680

(22) Filed: Mar. 29, 2018

(65) Prior Publication Data

US 2018/0294912 A1    Oct. 11, 2018

Related U.S. Application Data

(60) Provisional application No. 62/483,385, filed on Apr. 8, 2017.

(51) Int. Cl.
*H04J 14/00* (2006.01)
*H04B 10/20* (2006.01)
(Continued)

(52) U.S. Cl.
CPC .......... *H04J 14/0212* (2013.01); *G02B 6/356* (2013.01); *G02F 1/31* (2013.01);
(Continued)

(58) Field of Classification Search
USPC .................................. 398/45, 49, 68, 83
See application file for complete search history.

(56) References Cited

U.S. PATENT DOCUMENTS 6,801,551 B1 * 10/2004 Delfyett .................. H01S 5/065
349/29
8,089,683 B2 * 1/2012 Holmes ...................... G02B 5/32
359/279
(Continued)

FOREIGN PATENT DOCUMENTS

EP    3 012 830 A1    4/2016

OTHER PUBLICATIONS

D. Marom, et al., "Survey of Photonic Switching Architectures and Technologies in Suport of Spatially and Spectrally Flexible Optical Networking [Invited]", IEEE/OSA Journal of Optical Communications and Networking, vol. 9, Issue: 1, Jan. 2017, pp. 1-26.

(Continued)

*Primary Examiner* — David C Payne
*Assistant Examiner* — Pranesh K Barua
(74) *Attorney, Agent, or Firm* — Nokia Technologies Oy (57) ABSTRACT

An apparatus includes an optical wavelength selective switch that includes an optical wavelength separator, a layer of liquid crystal having a two-dimensional array of s electrically operable pixel regions, and an electronic controller connected to individual apply voltages across the pixel regions. The optical wavelength separator is configured to substantially direct individual wavelength ranges of light received at an input optical port to separate lateral areas of said layer of liquid crystal. The electronic controller is configured to apply the voltages such that at least one neighboring pair of the lateral areas have refractive indexes modulated along a first direction and are separated by a guard band of the pixel regions along a different second direction.

16 Claims, 5 Drawing Sheets

(51) Int. Cl.
  *H04J 14/02*  (2006.01)
  *H04Q 11/00*  (2006.01)
  *G02F 1/31*  (2006.01)
  *G02B 6/35*  (2006.01)

(52) U.S. Cl.
  CPC ..... *H04Q 11/0005* (2013.01); *G02F 2203/05* (2013.01); *H04Q 2011/0016* (2013.01); *H04Q 2011/0026* (2013.01); *H04Q 2011/0039* (2013.01); *H04Q 2011/0049* (2013.01); *H04Q 2011/0058* (2013.01)

(56) References Cited

U.S. PATENT DOCUMENTS

| | | | |
|---|---|---|---|
| 8,867,917 | B2 | 10/2014 | Frisken et al. |
| 9,495,728 | B2 | 11/2016 | Chao |
| 2003/0210727 | A1* | 11/2003 | Frisken ................. G02B 5/284 372/92 |
| 2004/0155895 | A1 | 8/2004 | Lai |
| 2007/0035706 | A1 | 2/2007 | Margulis |
| 2012/0224851 | A1* | 9/2012 | Takara ............... H04B 10/0793 398/45 |
| 2012/0236935 | A1* | 9/2012 | Dutt .................... H04N 19/176 375/240.03 |
| 2013/0094853 | A1* | 4/2013 | Mizutani .............. G02B 6/2938 398/34 |
| 2014/0285867 | A1* | 9/2014 | Wagener ................... G02F 1/31 359/279 |
| 2015/0043917 | A1* | 2/2015 | Simonneau ........... H04B 10/07 398/79 |
| 2015/0208144 | A1* | 7/2015 | Holmes ................. H04J 14/02 398/48 |
| 2015/0286340 | A1* | 10/2015 | Send ....................... G01S 17/46 345/175 |
| 2015/0338631 | A1* | 11/2015 | Matsumoto .......... G02B 21/082 359/316 |
| 2016/0191193 | A1* | 6/2016 | Mitchell ............. H04J 14/0221 398/27 |
| 2016/0301898 | A1* | 10/2016 | Asada .................. H04N 9/3164 |
| 2016/0301905 | A1* | 10/2016 | Asada .................. H04N 9/3182 |
| 2016/0316281 | A1* | 10/2016 | Keyworth ........... H04J 14/0212 |
| 2017/0248796 | A1* | 8/2017 | Banks .................. H04N 13/271 |
| 2019/0191116 | A1* | 6/2019 | Madurawe ........... H04N 5/3698 |

OTHER PUBLICATIONS

PCT International Search Report dated Jul. 5, 2018 (PCT/US2018/026166) 3 pages.

* cited by examiner

OPTICAL WAVELENGTH SELECTIVE SWITCHES WITH GUARD BANDS

This application claims the benefit of U.S. provisional application 62/483,385, filed Apr. 8, 2017, by Alan Fennema.

BACKGROUND

Technical Field

The invention relates to optical wavelength selective switches and methods for using optical wavelength selective switches.

Related Art

This section introduces aspects that may be help to facilitate a better understanding of the inventions. Accordingly, the statements of this section are to be read in this light and are not to be understood as admissions about what is prior art or what is not prior art.

An optical wavelength selective switch is (OWSS) an optical switching apparatus that directs light to an output based on the wavelength of the light. Optical wavelength selective switches have been fabricated with integrated optical technology, such as array waveguide grating technology. Optical wavelength selective switches have also been fabricated with free-space optical technologies such as, liquid crystal on semiconductor (LCOS) array devices and micro-electro-mechanical system (MEMS) mirror arrays. Presently, OWSSes are widely used in wavelength-division-multiplexing (WDM) bases optical telecommunication systems, e.g., in optical routing devices such as optical add-drop multiplexers (OADMs).

SUMMARY OF SOME ILLUSTRATIVE EMBODIMENTS

In first embodiments, an apparatus includes an optical wavelength selective switch that includes an optical wavelength separator, a layer of liquid crystal having a two-dimensional array of electrically operable pixel regions, and an electronic controller connected to individually apply voltages across the pixel regions. The optical wavelength separator is configured to substantially direct individual wavelength ranges of light received at an input optical port to separate lateral areas of said layer of liquid crystal. The electronic controller is configured to apply the voltages such that at least one neighboring pair of the lateral areas have refractive indexes modulated along a first direction and are separated by a guard band of the pixel regions along a different second direction.

In some of the first embodiments, the second direction is orthogonal to the first direction.

In any of the first embodiments, the guard band may have a width of one of the pixel regions along the second direction.

In any of the first embodiments, one or more of the pixel regions of the lateral areas of the at least one neighboring pair are nearest neighboring ones of the pixel regions of the array along the first direction.

In any of the first embodiments, the electronic controller may be able to apply substantially periodic voltages along the first direction across the pixel regions of the lateral areas of the at least one neighboring pair.

In any of the first embodiments, the electronic controller may be configured to apply voltages across the pixel regions of the two lateral areas of the at least one neighboring pair with different periods along the first direction to direct light incident on the two lateral areas of the at least one neighboring pair to different output optical ports of the optical wavelength selective switch.

In any of the first embodiments, the electronic controller may be configured to apply a voltage across the pixel regions of the guard band having a value near an average of a maximum and a minimum of the voltages applied across the pixel regions of the lateral areas of the at least one neighboring pair.

In any of the first embodiments, in the guard band, the electronic controller may be configured to apply a voltage with a value near a middle of a range of the voltages that the electronic controller is configured to apply across the pixel regions of the lateral areas.

In any of the first embodiments, the apparatus may further include a reconfigurable optical add drop multiplexer having a plurality of optical ports and including the optical wavelength selective switch. The optical wavelength selective switch may be connected to receive light from or direct light to one of the ports of the reconfigurable optical add drop multiplexer.

In any of the first embodiments, the apparatus may further include an optical cross connect having a plurality of optical ports and including the optical wavelength selective switch. The optical wavelength selective switch may be connected to receive light from or direct light to one of the ports of the optical cross connect.

In second embodiments, a method of operating an optical wavelength selective switch includes splitting a received light beam into wavelength ranges such that each wavelength range of the light beam is substantially directed towards a separate lateral region of a layer of liquid crystal. The layer includes electrodes for separately applying voltages across a two-dimensional array of pixel regions of the layer. The method also includes applying first voltages across the pixel regions of a neighboring pair of the lateral regions to modulate refractive indexes of the lateral regions along a first direction. The lateral regions of the neighboring pair are separated in a different second direction by a guard band of the pixel regions. The method also includes applying a same voltage across each pixel region of the guard band.

In any of the second embodiments, the applying a same second voltage may include applying a voltage within about 20 percent of or about 10 percent of an average of a maximum and a minimum of the first voltages applied to the pixel regions of one of the lateral regions of the neighboring pair.

In any of the second embodiments, the applying first voltages may modulate the refractive indexes of the lateral regions of the neighboring pair in a substantially periodic manner along the first direction.

In any of the second embodiments, the applying first voltages may modulate the refractive indexes of the lateral regions of the neighboring pair in a substantially periodic manner with different periods along the first direction. In any of the second embodiments, the optical wavelength selective switch may be included in a reconfigurable optical add drop multiplexer having a plurality of ports or may be included in an optical cross connect having a plurality of optical ports. In such second embodiments, the method may comprise the optical wavelength selective switch receiving light from or directing light to one of the ports of the reconfigurable optical add drop multiplexer or optical cross connect.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Figure 1:
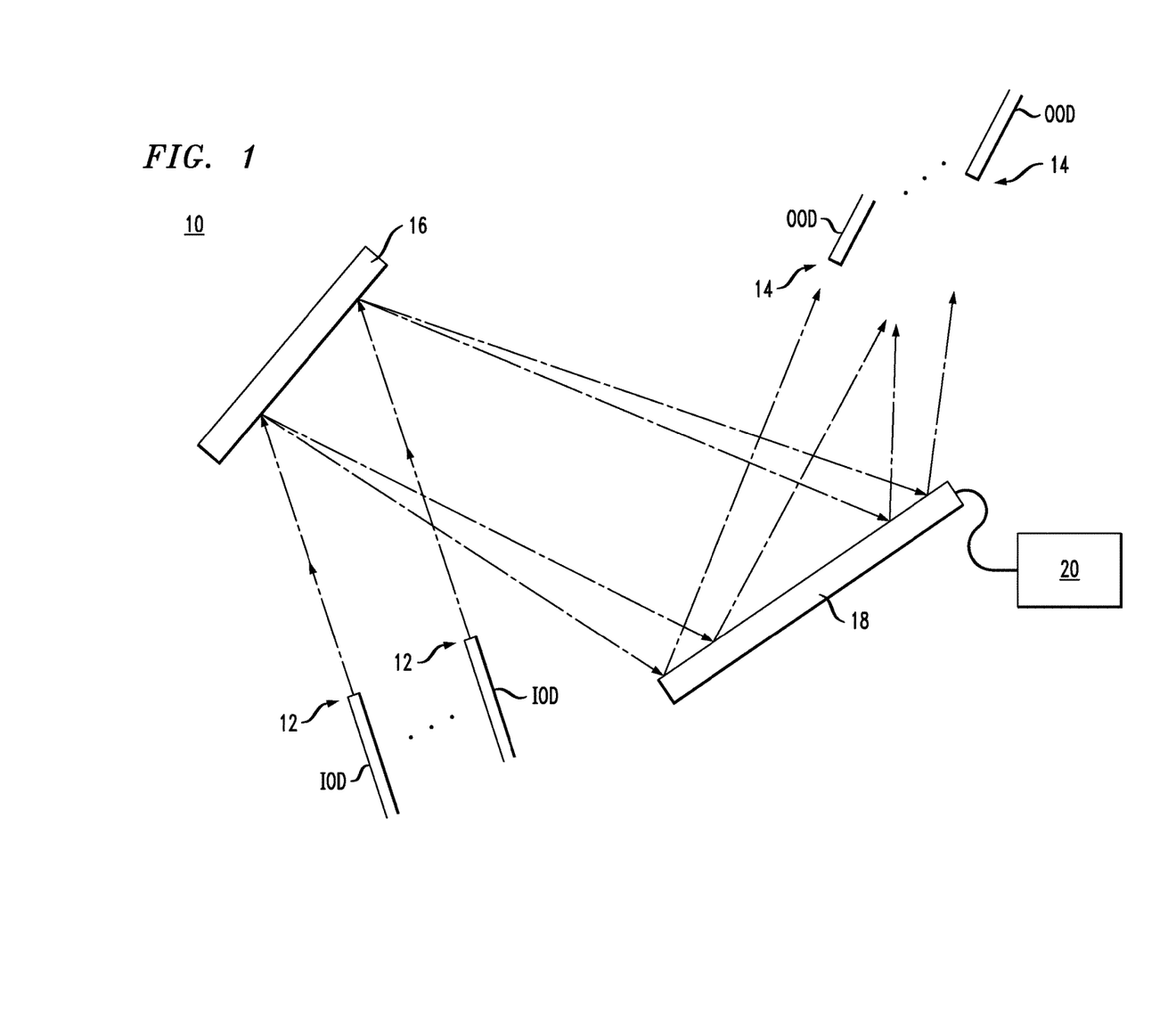
FIG. 1 schematically illustrates an optical wavelength selective switch (OWSS)

FIG. 1 schematically illustrates a free-space optical wavelength selective switch (OWSS) 10. The free-space OWSS includes one or more input optical ports 12, output optical ports 14, an optical wavelength separator 16, a layer of liquid crystal 18, and an electronic controller 20.

Each of the input optical ports 12 routes a light beam from an input optical device (IOD), e.g., an optical fiber or optical transmitter to optical wavelength separator 16. The light from the input optical ports 12 may pass through optional collimating, focusing, and/or turning optics, e.g., one or more conventional lenses and/or mirrors (not shown), prior to arriving at the optical wavelength separator 16 and/or after being optically dispersed thereby. Below, the OWSS is described, for simplicity, as an optical wavelength de-multiplexer, but the OWSS 10 can alternatively operate as an optical wavelength multiplexer, in which the output optical ports 14 function as optical inputs and the one or more input optical ports 12 function as optical outputs.

The optical wavelength separator 16 separates received light into disjoint wavelength ranges and transmits light of each such wavelength range to a separate lateral region of the a layer of liquid crystal 18. Between the optical wavelength separator 16 and the a layer of liquid crystal 18, light may pass through optional collimating, focusing, and/or turning optics, e.g., one or more conventional lenses and/or mirrors (not shown). The optical wavelength separator 16 may be, e.g., a conventional optically dispersive element such as an optical prism or a reflection or transmission optical grating.

Each of the output optical ports 14 receives a light beam from one or more of the spatially separate lateral regions of the layer of liquid crystal 18 and directs said received light to a corresponding output optical device (OOD) thereat, e.g., an end of an optical fiber or input of an optical receiver. The light from the input optical ports 12 may pass through collimating, focusing, and/or turning optics, e.g., one or more conventional lenses and/or mirrors, prior to arriving at the layer of liquid crystal 18.

In some alternate embodiments, the free-space OWSS 10 may be configured as a double pass device in which the layer of liquid crystal 18 reflects light back to the optical wavelength separator 16 prior to reflection or transmission thereby to the output optical ports 14. In some such embodiments, the optical wavelength separator 16 may function to optically wavelength multiplex some such wavelength ranges to the same one of the output optical ports 14.

The layer of liquid crystal 18 includes a two-dimensional (2D) array of separate pixel regions, which are individually defined by corresponding electrodes on one or both sides of the layer 18. The electrodes are individually operable via the electronic controller 20 to apply voltages across the pixel regions of the layer 18 and thereby substantially control the refractive indexes thereof. The refractive indexes may be controlled to produce grating-like refractive index patterns on lateral areas of the layer 18 so that incident light beams are redirected towards selected ones of the output optical ports 14 and/or may be operated to have partially random refractive index patterns thereon to selectively attenuate selected ones of said incident light beams.

In different embodiments, the layer of liquid crystal 18 may be either an optically transmissive layer or an optically reflective layer, e.g., having a reflective back surface.

Figure 2:
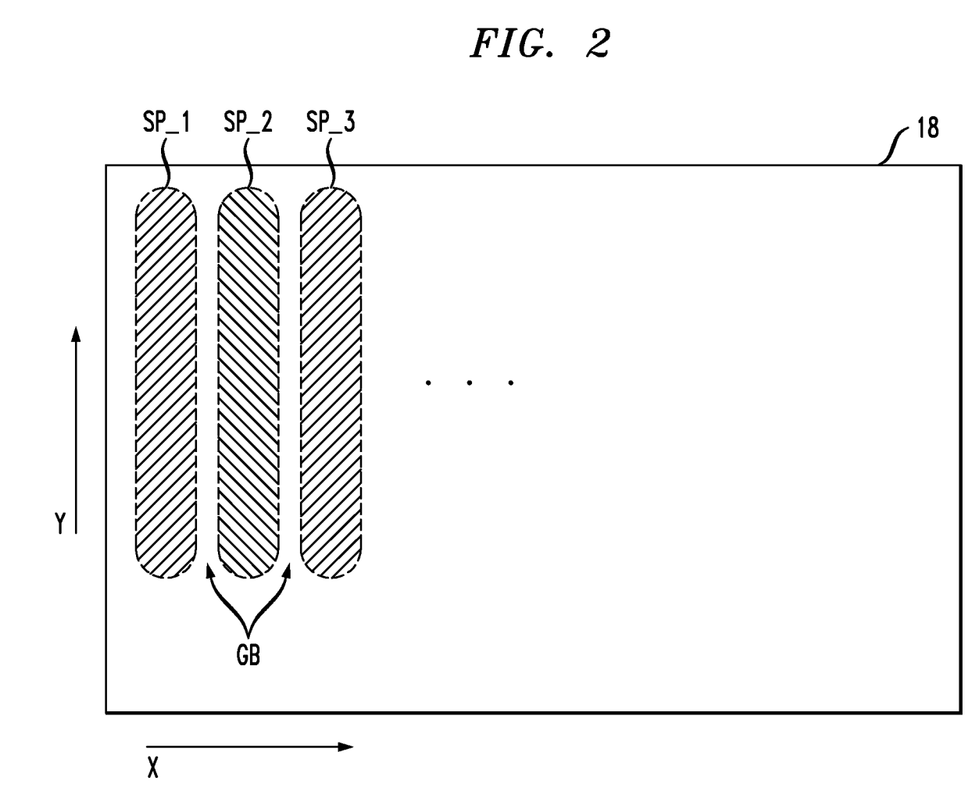
FIG. 2 is a top view schematically illustrating a layer of liquid crystal, e.g., an LCOS display, of an OWSS as configured to phase modulate a plurality of separate light spots, e.g., in the OWSS of FIG. 1.
Figure 3:
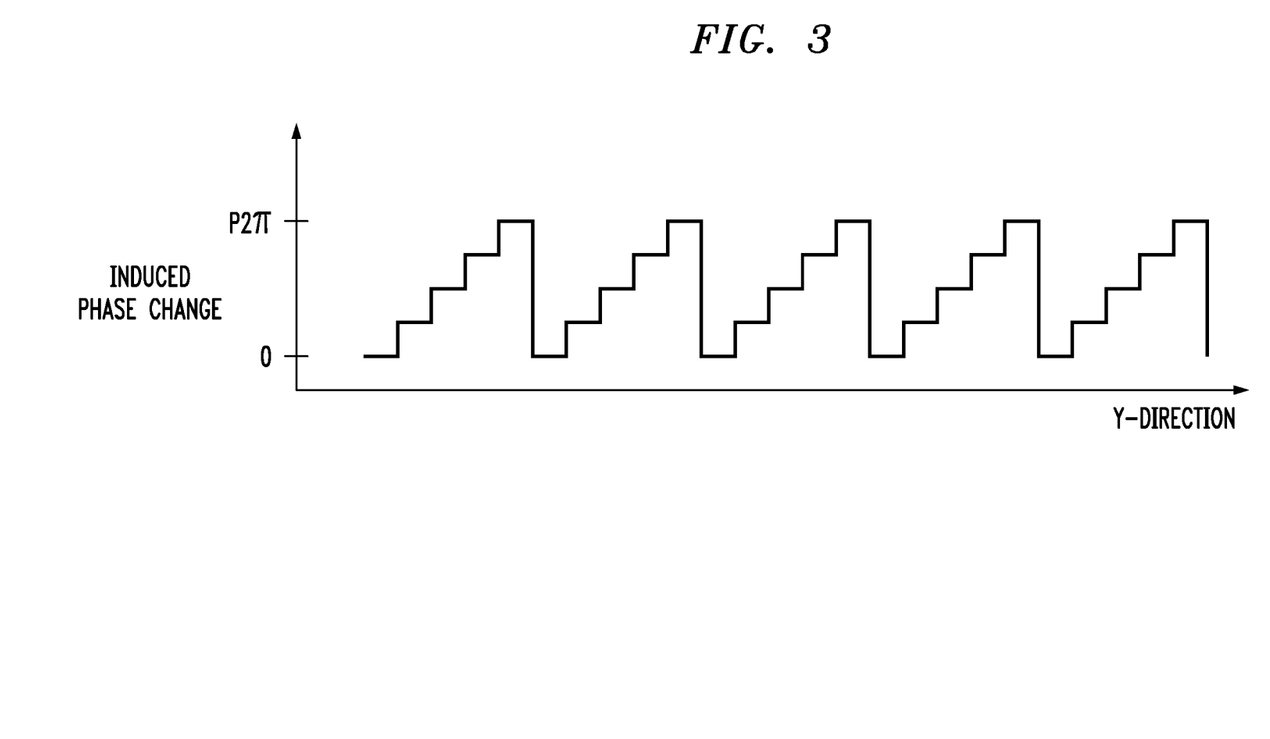
FIG. 3 schematically illustrates an example of the phase modulation of light produced by the layer of liquid crystal of FIG. 2 in a lateral area of one light spot along the Y-direction.

FIGS. 2 and 3 illustrate an example operation of the layer of liquid crystal 18 on light beams incident thereon.

FIG. 2 shows exemplary light spots SP_1, SP_2, SP_3, . . . formed by light of individual wavelength ranges on separate lateral areas of the layer of liquid crystal 18. The light spots SP_1, SP_2, SP_3, . . . are formed due to wavelength dispersion of light received from the input optical port 12, i.e., as caused by the optical wavelength separator 16 and by any optional intervening focusing, collimation, and/or turning optics. The light spots SP_1, SP_2, SP_3, . . . are in laterally spatially separated areas on the layer 18 so that different ones of the light spots SP_1, SP_2, SP_3, . . . are typically not significantly incident on the same lateral area of the layer of liquid crystal 18 or on the same controllable pixel region. Instead, between nearest neighbor ones of the light spots SP_1, SP_2, SP_3, . . . , a guard band (GB) of pixel regions is maintained by operation of the electronic controller 20, as is explained below. A guard band GB may separate neighboring ones of the light spots SP_1, SP_2, SP_3 . . . only in the X-direction, which is transverse to the modulation direction of the lateral areas of the layer 18 thereunder, or may separate neighboring ones of the light spots SP_1, SP_2, SP_3, . . . in two different directions along the layer 18, e.g., in the X and Y directions.

FIG. 3 schematically illustrates an exemplary modulation of the phase of incident light, which may be produced by the lateral area of the layer 18 under one or more of the light spots SP_1, SP_2, SP_3, . . . of FIG. 2. The local phase modulation is produced by a passage of light through the thickness of a pixel region in a transmissive embodiment of the layer of liquid crystal 18 and by a double passage of the light through the thickness of the pixel region in a reflective embodiment of the layer of liquid crystal 18. The individual pixel regions are typically electrically operated to produce an approximately periodic phase modulation of light incident on the corresponding lateral regions of the layer 18, in the Y-direction, e.g., as alternatively produced by an optical grating. The approximately periodic phase modulation of said incident light will cause interference between different transmitted or reflected portions of the light of the one of the light spots SP_1, SP_2, SP_3, . . . of FIG. 2. The periodic phase modulation routes the light of the individual light spot SP_1, SP_2, SP_3, . . . of FIG. 2 in a selected direction, in a plane including the Y-direction, and the incident direction of the light on the layer of liquid crystal 18. A different modulation period could cause said incident light to be routed in a different selected direction in said plane. That is, the approximate period of the phase modulation, i.e., the approximate modulation period of the refractive index of the corresponding lateral area of the layer 18, is selectively configured by the electronic controller 18 to cause light of said individual light spot SP_1, SP_2, SP_3, . . . to be routed toward a desired optical output port 14 of FIG. 1. The lateral area may also be partially randomly modulated in the Y-direction to cause scattering loss and attenuation of some of the received light, e.g., for equalization of intensities of light of different wavelength channels.

Figure 4:
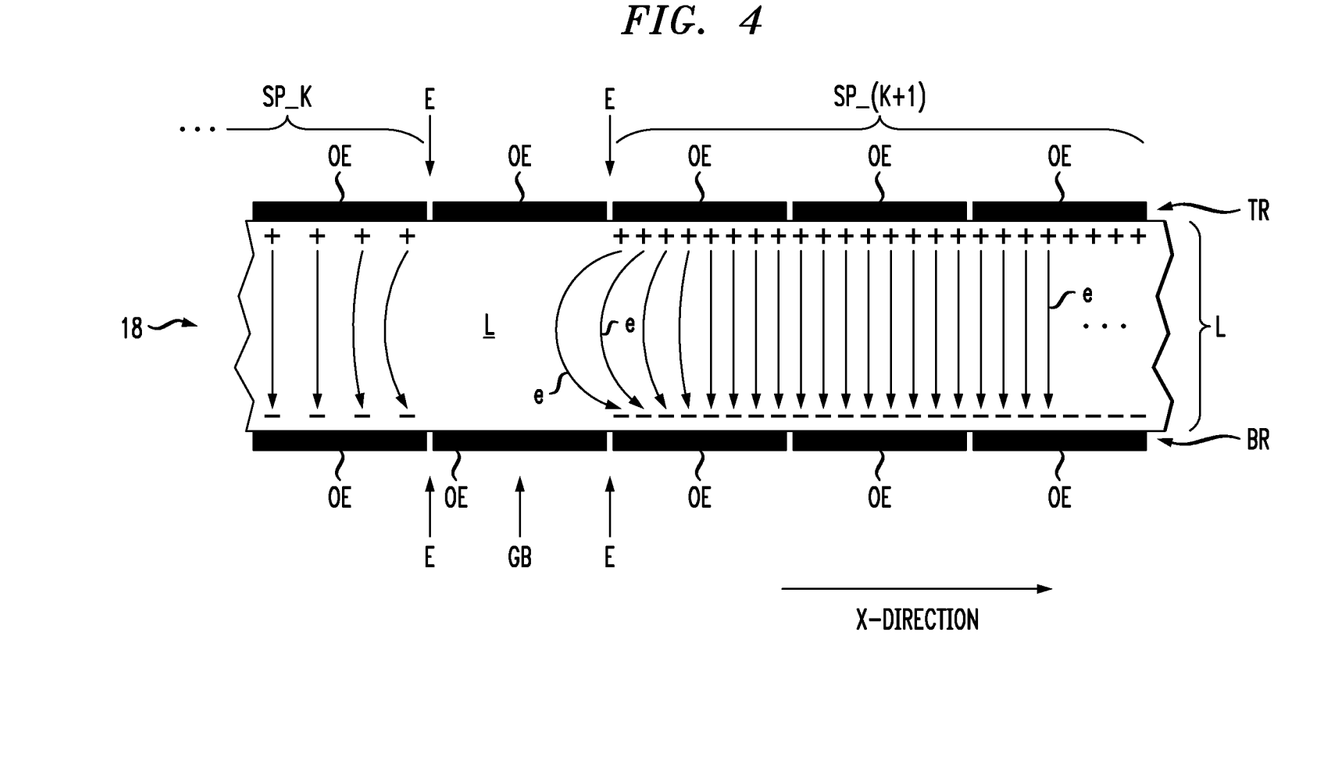
FIG. 4 is cross-sectional view that schematically illustrates an embodiment of a layer of liquid crystal with separately operable pixel regions, e.g., a cross section of the layer of liquid crystal of FIG. 2 along the X-direction.

FIG. 4 schematically illustrates a cross section through a portion of the layer of liquid crystal 18 of FIG. 2 along the X-direction in FIG. 2. The view shows a layer L of liquid crystal material, a top row (TR) of operating electrodes (OE), e.g., transparent electrodes, e.g., of indium tin oxide, and a bottom row (BR) of operating electrodes (OE) on the opposite surfaces of the layer L. The bottom row BR may be optically transparent electrodes, e.g., in optically transmission embodiments of the layer 18 of liquid crystal, or may be optically reflective, e.g., metallic electrodes in optically reflective embodiments of the layer of liquid crystal 18. Also, one of the top and bottom rows TR, BR may be a continuous electrode layer, e.g., a grounding layer and still enable individual electrical operation of different ions of the pixel regions.

In the layer 18, a separate facing pair of TR and BR operating electrodes OE, at facing lateral areas of the surfaces of the layer 17 define an individual pixel region of the layer 18 of liquid crystal. In embodiments where the top row TR or bottom row BR is formed by a continuous electrode, the individual pixel regions are defined by the individual operating electrodes of the facing bottom row BR or top row TR.

During operation, a facing pair of the operating electrodes OE accumulates opposite + and − charges in response to application of a voltage across the facing pair of operating electrodes of the pixel region by the electronic controller 20 of FIG. 1. The electronic controller 20 is electrically connected, by operating lines, to enable application of different operating voltages across different individual ones of the facing pairs of operating electrodes during operation, i.e., to apply voltages individually across the corresponding pixel regions.

In one row along the X-direction, the operating electrodes for the same light spot, e.g., SP_K or SP_(K+1), may have the same voltage applied there across during operation. But, such operating voltages can vary for the pixel regions, e.g., located in the same row in the X-direction, under different ones of the light spots SP_K, SP_(K+1). Also, the applied operating voltages can vary between the pixel regions under the light spots SP_K, SP_(K+1) and the pixel regions of the guard band GB there between.

FIG. 4 also qualitatively illustrates electric field lines "e", i.e., indicated as arrowed lines. The electric field lines go between the operating electrodes OE of facing pairs due to opposite + and − charges located thereon. For a thin layer L of liquid crystal material, such electric field lines would typically be approximately straight, but such an electric field line e may bend where a charge density gradient exists on the operating electrodes OE of the top and bottom rows TR, BR. Such variations in charge densities occur at edges E-E of the light spots SP_K, SP_(K+1), e.g., due to differences in the Y-direction modulation periods of the lateral areas of the layer of liquid crystal 18. At such an edge E-E, an electric field line e may bulge inwardly into layer L liquid crystal material of pixel region(s) of the same light spot SP_K-SP_(K+1) or may bulge outwardly into liquid crystal material of pixel region(s) of the neighboring light spot SP_K, SP_(K+1) at an edge E-E.

Since the local intensity of the electric field determines the refractive index of the liquid crystal material of the layer L, bending of the electric field lines "e" at such edges E-E can cause cross talk between the controlling voltages of the neighboring light spots SP_K, SP_(K+1). For example, the period of the Y-direction modulation of the refractive index may be different in neighboring light spots SP_K and SP_(K+1) making such variations at the edges E-E along the X-direction inevitable. Such operating voltage crosstalk can cause the pixel regions at one side of such an edge E-E to partially have a modulation period in the Y-direction of the pixel regions of the neighboring light spot SP_K, SP_(K+1), which is at the other X-direction side of such an edge E-E. Such operating voltage crosstalk can cause light loss and/or light misdirection in an OWSS, e.g., the OWSS 10 of FIG. 1.

To reduce such crosstalk, various embodiments of the OWSS 10 of FIG. 1 may, e.g., configure a guard band GB of pixel regions between the pixel regions of neighboring ones of the light spots SP_K, SP_(K+1) as shown in FIG. 4. The guard band GB may be one or more than one pixel regions wide in the X-direction and may or may not exist between pixel regions of neighboring ones of the light spots SP_K, SP_(K+1) in the Y-direction of intra spot modulation. In one of the guard bands GB, each pixel region may have the same voltage there across. That is, the operating voltage is typically approximately constant in the Y-direction across the pixel regions of the same guard band GB. While the pixel regions of the guard band GB may have average refractive indexes that are still somewhat modulated by the electric fields operating the pixel regions of adjacent light spots SP_K, SP_(K+1), the intervening pixel regions of the guard band GB can reduce the crosstalk between the control voltages to the pixel regions of such adjacent light spots SP_K, SP_(K+1).

In some embodiments of the OWSS 10 of FIG. 1, the voltage applied across the pixel regions of the guard band GB are set at approximately the middle of voltage ranges used, by the electronic controller 20, to operate pixel regions of one or more of the lateral area(s) under the light spots SP_1, SP_2, SP_3, . . . , e.g., one or more of the light spots of the neighboring pair thereof. In particular, the voltages applied across the pixel regions of a guard band GB may be equal to an average of a minimum voltage and a maximum voltage applied across the pixel regions of one or more of the light spots SP_1, SP_2, SP_3, . . . , e.g., ± an error of 20 percent, 10 percent or less. Setting the operating voltages of the pixel regions of a guard band GB at such approximate mid-range values, i.e., mid-range when averaged along the Y-direction of light spot(s), is believed by the inventor to likely reduce optical diffractive losses in the lateral areas of the liquid crystal layer 18 at the edges of the light spots SP_1, SP_2, SP_3, . . . .

Figure 5:
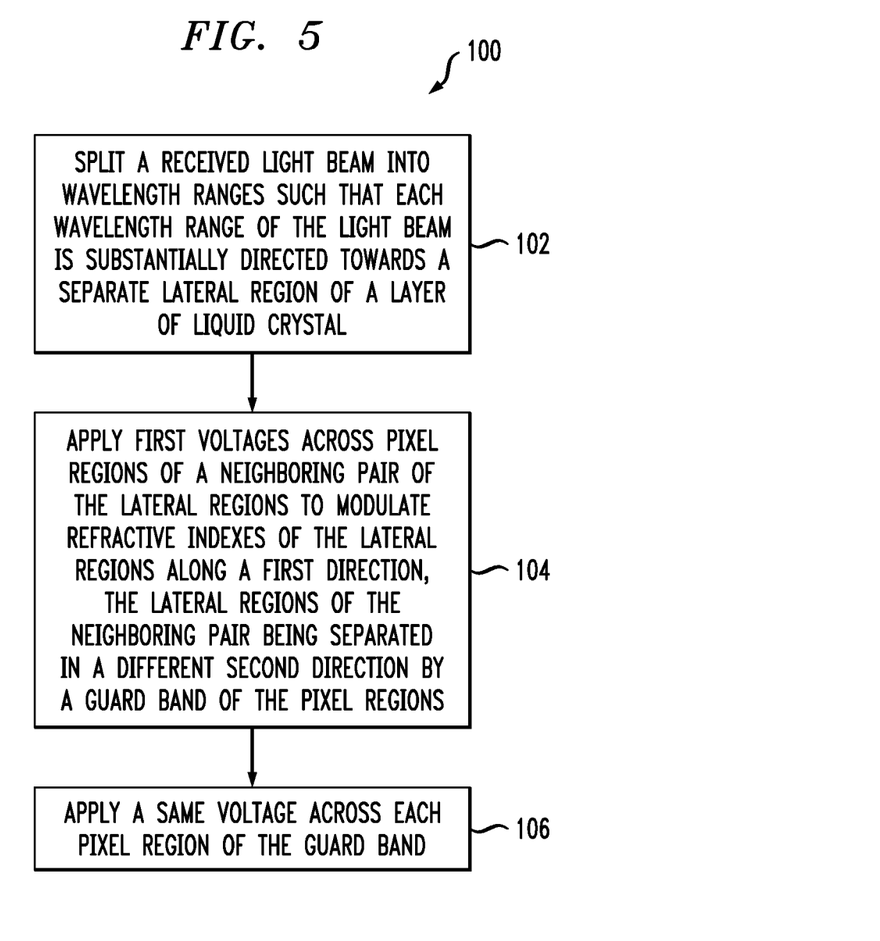
FIG. 5 is a flow chart schematically illustrating a method of operating an OWSS, e.g., the OWSS of FIG. 1.

FIG. 5 is a flow chart schematically illustrating a method 100 of operating an OWSS, e.g., the OWSS 10 of FIG. 1.

The method 100 includes splitting a received light beam into wavelength ranges such that each wavelength range of the light beam is directed towards a separate lateral region of a layer of liquid crystal (step 100). The splitting step 10 may be performed with the optical wavelength separator 16 of FIG. 1, e.g., a conventional optical prism or transmission or reflective optical grating. The layer includes electrodes for separately applying voltages across a two-dimensional array of pixel regions of the layer, e.g., as in the layer of liquid crystal 18 of FIGS. 1-4.

The method 100 includes applying first voltages across the pixel regions of a neighboring pair of the lateral regions to modulate refractive indexes of the lateral regions along a first direction (step 104). The lateral regions of the neighboring pair are separated in a different second direction by a guard band of the pixel regions, e.g., as in the lateral regions under light spots SP_1-SP_3 and SP_K-SP_(K+1) and the guard bands (GB) of FIGS. 2 and 4. In some embodiments, the applying step 104 may apply voltages to the pixels regions of the lateral regions, e.g., of the neighboring pair, in a substantially periodic manner along the first direction. Indeed, the applying step 104 may apply voltages to the lateral regions of the neighboring pair in a substantially periodic manner with different periods along the first direction, e.g., to direct light incident onto said pair of the lateral regions to two different output optical ports of the optical wavelength selective switch. Such modulation of the applied voltage pattern in the first direction typically also causes a modulation of the refractive indexes of the lateral regions in an approximately periodic manner along the first direction. For example, the modulation may be approximated by a discretized saw tooth pattern along the first direction.

The method also includes applying a same voltage across each pixel region of the guard band (step 106). That is, the method 100 produces guard bands between ones of the lateral regions, which are a neighboring pair. In some embodiments, the applying step 106 may involve applying a voltage within about 20 percent of or about 10 percent of an average of a maximum and a minimum of the first voltages applied to the pixel regions of one or both of the lateral regions of the neighboring pair.

Typically, the applying steps 104 and 106 are performed while the splitting step 102 is performed so that the lateral regions and the guard ban have refractive indexes set by the applying steps 104, 106 while the splitting step 102 directs the wavelength ranges of the received light beam towards the layer of liquid crystal.

The method 100 may be used, e.g., to operate one or more optical wavelength selective switches of a reconfigurable optical add/drop multiplexer or of an optical cross connect for optically connecting optical fibers.

An alternate method involves performing the steps 102, 104, and 106 of the method 100 with the modification that the splitting a received light beam into wavelength ranges, i.e., the step 100, is replaced by a step of combining received wavelength ranges of light into a light beam. The combining step may use a conventional optical prism or a conventional reflective or transmissive optical grating. In the alternate method, each such wavelength range of light is received from a separate lateral region of the layer of liquid crystal. The alternate method also may include performing the applying steps 104 and 106 of the method 100 simultaneously with performing the above-described combining step. The alternate method involves performing optical wavelength multiplexing rather than optical wavelength de-multiplexing as performed in the method 100 of FIG. 5. The alternate method may also be used, e.g., to operate one or more optical wavelength selective switches of a reconfigurable optical add/drop multiplexer or of an optical cross connect for optically connecting optical fibers.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
   an optical wavelength selective switch comprising an optical wavelength separator, a layer of liquid crystal having a two-dimensional array of electrically operable pixel regions, and an electronic controller connected to individually apply voltages across the pixel regions; and
   wherein the optical wavelength separator is configured to substantially direct individual wavelength ranges of light received at an input optical port to separate lateral areas of said layer of liquid crystal;
   wherein the electronic controller is configured to apply the voltages such that at least one neighboring pair of the areas have refractive indexes modulated along a first direction, the areas of the at least one neighboring pair being separated by a guard band of the pixel regions along a different second direction; and
   wherein in the guard band, the electronic controller is configured to apply a voltage with a value near a middle of a range of the voltages that the electronic controller is configured to apply across the pixel regions of the areas of the at least one neighboring pair.

2. The apparatus of claim 1, wherein the second direction is orthogonal to the first direction.

3. The apparatus of claim 1, wherein the guard band has a width of one of the pixel regions along the second direction.

4. The apparatus of claim 3, wherein one or more of the pixel regions of the areas of the at least one neighboring pair are nearest neighboring ones of the pixel regions of the array along the first direction.

5. The apparatus of claim 1, wherein one or more of the pixel regions of the areas of the at least one neighboring pair are nearest neighboring ones of the pixel regions of the array along the first direction.

6. The apparatus of claim 1, wherein the electronic controller is able to apply substantially periodic voltages along the first direction across the pixel regions of the areas of the at least one neighboring pair.

7. The apparatus of claim 1, wherein the electronic controller is configured to apply voltages across the pixel regions of the areas of the at least one neighboring pair with different periods along the first direction to direct light incident on the areas of the at least one neighboring pair to different output optical ports of the optical wavelength selective switch.

8. The apparatus of claim 1 further comprising a reconfigurable optical add drop multiplexer having a plurality of optical ports and including the optical wavelength selective switch, the optical wavelength selective switch being connected to receive light from or direct light to one of the ports of the reconfigurable optical add drop multiplexer.

9. The apparatus of claim 1 further comprising an optical cross connect having a plurality of optical ports and including the optical wavelength selective switch, the optical wavelength selective switch being connected to receive light from or direct light to one of the ports of the optical cross connect.

10. An apparatus, comprising:
an optical wavelength selective switch comprising an optical wavelength separator, a layer of liquid crystal having a two-dimensional array of electrically operable pixel regions, and an electronic controller connected to individually apply voltages across the pixel regions; and
wherein the optical wavelength separator is configured to substantially direct individual wavelength ranges of light received at an input optical port to separate areas of said layer of liquid crystal;
wherein the electronic controller is configured to apply the voltages such that at least one neighboring pair of the areas have refractive indexes modulated along a first direction, the areas of the at least one neighboring pair being separated by a guard band of the pixel regions along a different second direction; and
wherein the electronic controller is configured to apply a voltage across the pixel regions of the guard band having a value near an average of a maximum and a minimum of the voltages applied across the pixel regions of the areas of the at least one neighboring pair.

11. A method of operating an optical wavelength selective switch, comprising:
splitting a received light beam into wavelength ranges such that each wavelength range of the light beam is substantially directed towards a separate area of a layer of liquid crystal, the layer including electrodes for separately applying voltages across a two-dimensional array of pixel regions of the layer;
applying first voltages across the pixel regions of a neighboring pair of the areas to modulate refractive indexes of the areas of the neighboring pair along a first direction, the areas of the neighboring pair being separated in a different second direction by a guard band or the pixel regions; and
applying a same second voltage across each pixel region of the guard band; and
wherein the applying a same second voltage includes applying a voltage within about 20 percent of an average of a maximum and a minimum of the first voltages applied across the pixel regions of one of the areas of the neighboring pair.

12. The method of claim 11, wherein the applying a same second voltage includes applying a voltage within about 10 percent of an average of a maximum and a minimum of the first voltages applied to the pixel regions of one of the areas of the neighboring pair.

13. The method of claim 11, wherein the applying first voltages modulates the refractive indexes of the areas of the neighboring pair in a substantially periodic manner along the first direction.

14. The method of claim 11, wherein the applying first voltages modulates the refractive indexes of the areas of the neighboring pair in a substantially periodic manner with different periods along the first direction.

15. The method of claim 11, wherein the optical wavelength selective switch is included in a reconfigurable optical add drop multiplexer having a plurality of ports; and wherein the method further comprises the optical wavelength selective switch receiving light from or directing light to one of the ports of the reconfigurable optical add drop multiplexer.

16. The method of claim 11, wherein the optical wavelength selective switch is included in an optical cross connect having a plurality of optical ports; and wherein the method includes the optical wavelength selective switch receiving light from or directing light to one of the ports of the optical cross connect.

* * * * *